(12) United States Patent
Bellucci et al.

(10) Patent No.: US 7,065,971 B2
(45) Date of Patent: Jun. 27, 2006

(54) DEVICE FOR EFFICIENT USAGE OF COOLING AIR FOR ACOUSTIC DAMPING OF COMBUSTION CHAMBER PULSATIONS

(75) Inventors: Valter Bellucci, Fislisbach (CH); Jonas Hurter, Baden (CH); Joerg Pross, Albbruck (DE)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 10/792,709

(22) Filed: Mar. 5, 2004

(65) Prior Publication Data
US 2004/0172948 A1     Sep. 9, 2004

(30) Foreign Application Priority Data
Mar. 5, 2003    (GB) ................................. 0305025.9

(51) Int. Cl.
*F23R 3/02* (2006.01)
(52) U.S. Cl. .......................................... 60/725; 60/752
(58) Field of Classification Search ................ 60/725, 60/752, 753, 754, 758
See application file for complete search history.

(56) References Cited

U.S. PATENT DOCUMENTS

| | | | | |
|---|---|---|---|---|
| 2,548,485 | A | * | 4/1951 | Lubbock ....................... 60/753 |
| 3,439,774 | A | | 4/1969 | Callaway et al. ............. 181/42 |
| 3,640,357 | A | | 2/1972 | Kitching et al. .............. 181/33 |
| 3,831,710 | A | | 8/1974 | Wirt .............................. 181/33 |
| 5,079,915 | A | * | 1/1992 | Veau ............................. 60/753 |
| 5,782,082 | A | | 7/1998 | Hogeboom et al. ......... 60/226.1 |
| 5,799,491 | A | * | 9/1998 | Bell et al. ..................... 60/752 |
| 6,470,685 | B1 | | 10/2002 | Pidcock et al. | |

FOREIGN PATENT DOCUMENTS

| | | |
|---|---|---|
| DE | 197 27 407 | 1/1999 |
| EP | 0 210 462 | 2/1987 |
| EP | 0 321 809 | 6/1991 |
| EP | 1 035 377 | 9/2000 |
| EP | 1 284 390 | 2/2003 |
| EP | 1 434 006 | 6/2004 |

OTHER PUBLICATIONS

Hill et al. Mechanics And Thermodynamics Of Propuilsion; Addison-Wesley, 1965. p. 7-4.*
Copy of Search Report for German Patent Appl. No. 10 2004 010 620.7 (Jul. 13, 2005).

* cited by examiner

*Primary Examiner*—Louis J. Casaregola
(74) *Attorney, Agent, or Firm*—Cermak & Kenealy, LLP; Adam J. Cermak

(57) ABSTRACT

Combustion driven pressure pulsations may limit the range of operating conditions where a modern gas turbine can operate with low emission and high efficiency performance. The control of acoustic vibrations has been consequently growing as an essential issue in gas turbine design, development and maintenance. The basic idea of the present invention is to use cooling air leakage through the gaps (7) of combustor liner segments (3;4) to get acoustic damping of combustion pulsations. The main component of the design is the sealing device (8) which covers the gap (7) between the two liner segments (3) and (4). The sealing device (8) collects in the plenum (9) some of the cooling air (6) flowing between the outer casing (1) and the inner liner structure (2). For this purpose the sealing device (8) is provided with openings (12) along the side walls (10) which allow the cooling air (6) to enter the plenum (9). In the plenum (9) the cooling air (6) is distributed along the gap (7) and discharged through openings (13), distributed along the top side (11) of the sealing device (8). The jets (18) discharged through the openings (13) achieve the additional effect to dampen acoustic pulsations in the combustion chamber (17).

4 Claims, 2 Drawing Sheets

DEVICE FOR EFFICIENT USAGE OF COOLING AIR FOR ACOUSTIC DAMPING OF COMBUSTION CHAMBER PULSATIONS

BACKGROUND OF THE INVENTION

1. Field of the Invention

The invention relates to a method and a device for efficient usage of the cooling air leakage through the gaps of the combustor liner segments to get an acoustic damping of combustion pulsations.

2. Discussion of Background

In modern industrial gas turbines operating with premixed combustion flames, the suppression of pressure pulsations is an important task related to the quality of the combustion process and to the structural integrity of engines. In order to reduce pulsations acoustic damping techniques may be employed.

In conventional premixing swirl burners the flame is stabilized by means of the vortex break-down bubble produced by swirling the premixed mixture (see for instance the dual burner as described in EP 0210462 or EP 0321809). In this type of combustion systems pulsations caused by the combustion process may be damped using axoustic screens. Acoustic screens are widely used to dampen noise generated in rocket engines or in aircraft engines. An acoustic screen consists of a perforated screen lining the engine ducts (e.g. the fan duct of a turbofan engine). The perforated screen has a back imperforated screen and in the cavity between the two screens a honeycomb core sandwiched may be located. The goal of the acoustic screen is to realize a wall not fully reflecting on the acoustic point of view and able to dampen pulsations in a broad range of frequency. The acoustic behaviour of the acoustic screen is defined by means of its impedance $Z=R+iX$, i.e. the ratio between acoustic pressure and velocity normal to the wall both defined in the frequency domain. The real part R of the impedance is the resistance and the imaginary part X is the reactance. The acoustic screen resistance R is related to dissipative processes occuring in the acoustic screen holes. The main dissipative effect is in the conversion of acoustic energy into shedding of vorticity generated at the rims of the screen holes, convected downstream and finally dissipated into heat by turbulence. The acoustic screen reactance X represents the inertia of the fluid fluctuating in the holes and in the back cavity under the effect of the acoustic field. To dampen specific acoustic modes, acoustic screens are designed to have R close to $\rho c$ (being $\rho$ the fluid density and c the fluid speed of sound) and $X \ll \rho c$ in the range of frequency where such modes occur. Note that the conditions $R=\rho c$ and $X=0$ correspond to the anechoic condition, i.e. the full absorption of the acoustic energy of a normally incident plane wave. The efficiency of an acoustic screen is strongly related to the portion of surface the acoustic screen covers. Different acoustic screen designs have been proposed, where the band of damped frequency was eventually extended by means of multi-layer acoustic screens (U.S. Pat. No. 3,439,774; U.S. Pat. No. 3,640,357; U.S. Pat. No. 5,782,082) or by a non-uniform distribution of honeycomb cells (U.S. Pat. No. 3,831,710).

In combustion chambers, used in large industrial gas turbines, but also found in other combustion engines, a solid casing forms the outer structure of the combustion chamber. For cost reasons, this relative large part is usually made of a material like cast steel, which cannot withstand the hot combustion air and thus has to be protected. This is done by covering the inner surface of the combustion chamber casing with a liner or shell made of a high temperature resistant material (Ni base alloy or even structural ceramics) which is cooled from the back side, to keep the high temperatures away from the casing material. From a design point of view, it is advantageous to use multiple segments for the inner liner instead of one single piece, because assembly is facilitated and the thermal stresses in the liner are kept lower. A disadvantage of the segmented liner is that there are always gaps of finite width between the individual segments. As a consequence, there is a risk of hot combustion gas penetrating into the gaps, which in long term would damage the casing structure. Therefore, the gaps have to be purged by a controlled leakage of cooling air. As this additional cooling air is bypassed from the combustion process, it creates undesired performance and eficiency losses.

SUMMARY OF THE INVENTION

The basic idea of the present invention is to get an additional benefit from the inevitable cooling air leakage through the gaps, by using it for the acoustic damping of combustion pulsations.

In accordance with the present invention the cooling air leakage through the combustor liner segments is used to dampen combustion pulsations. Since these combustor pulsations cannot always be completely avoided in combustors, operating in lean premix regime and since they can cause severe damage to all structural parts of an engine, an efficient damping mechanism is advantageous for the operability of the combustor and the integrity of the structural parts. The main principle of the idea is to control the discharge of the cooling air leakage into the main flow of the combustor by using an appropriate design, which creates individual air jets instead of forming a diffuse and rather uncontrolled leakage flow. Such jets can be seen as acoustic screen jets and then the anechoic condition $Z=\rho c$ is required for them in order to absorb all the acoustic energy of a normally incident plane wave. The jets represent the acoustic screen "bias flow" giving a linear contribution to R (bias flow convection of vorticity). The linear effect is prevalent on the nonlinear one (acoustic velocity convection of vorticity) when the bias velocity is greater than the acoustic velocity in the hole. In this case R depends on frequency only and can be tuned by acting on the bias flow velocity and screen porosity, independently of the acoustic field.

Upwind the acoustic screen discharging holes, a plenum is used to distribute the cooling air and to tune the reactance X to zero in correspondence of the frequency to dampen. This allows to uncouple the acoustic domains upstream and downstream the acoustic screen.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Only the elements essential for the understanding of the invention are shown. Not shown are, for example, the compressor, the turbine, the combustor plenum upstream the burner and the fuel system.

DESCRIPTION OF THE PREFERRED EMBODIMENTS

Figure 1A:
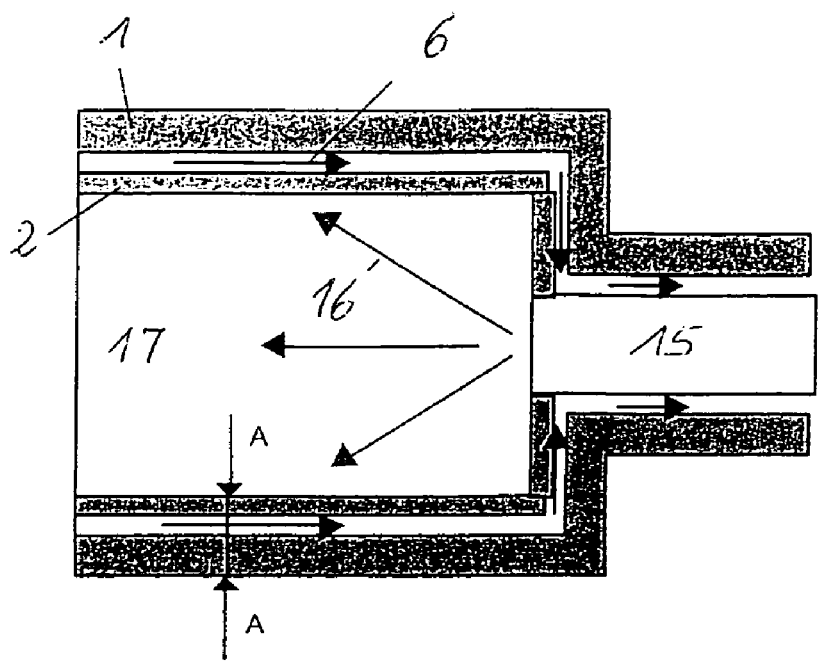
FIGS. 1a and 1b illustrate a design principle for combustion chambers with liner segments and cooling air leakage through segment gaps.
Figure 1B:
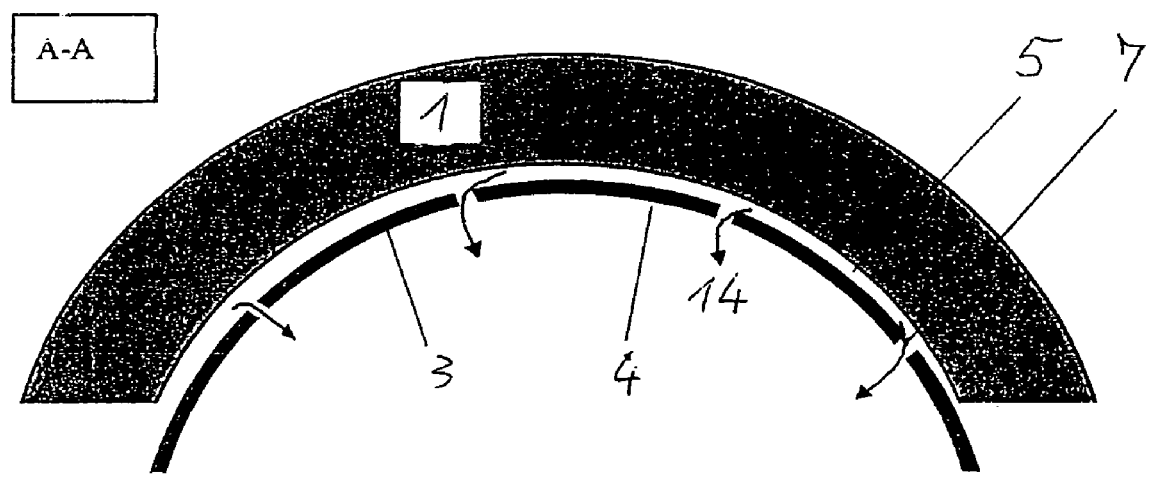

Referring to the drawings, FIGS. 1a and 1b illustrate a design principle for combustion chambers, which is widely used especially in large industrial gas turbines, but also found in other combustion engines. The casing (1) is the outer structure of the combustion system, formed by the burner (15) and the combustion chamber (17), in which the hot gas (16) flows. The inner surface of the combustion chamber casing (1) is covered with liner segments (3;4), cooled on the back side by the cooling flow (6). In the gaps (7) between liner segments (3;4) the cooling air leakage (14) is flowing out. In FIG. 1b a cross section of an annular combustion chamber is shown as an example, but the same design principles can be applied to other types of combustion chambers like silo combustors.

Figure 2:
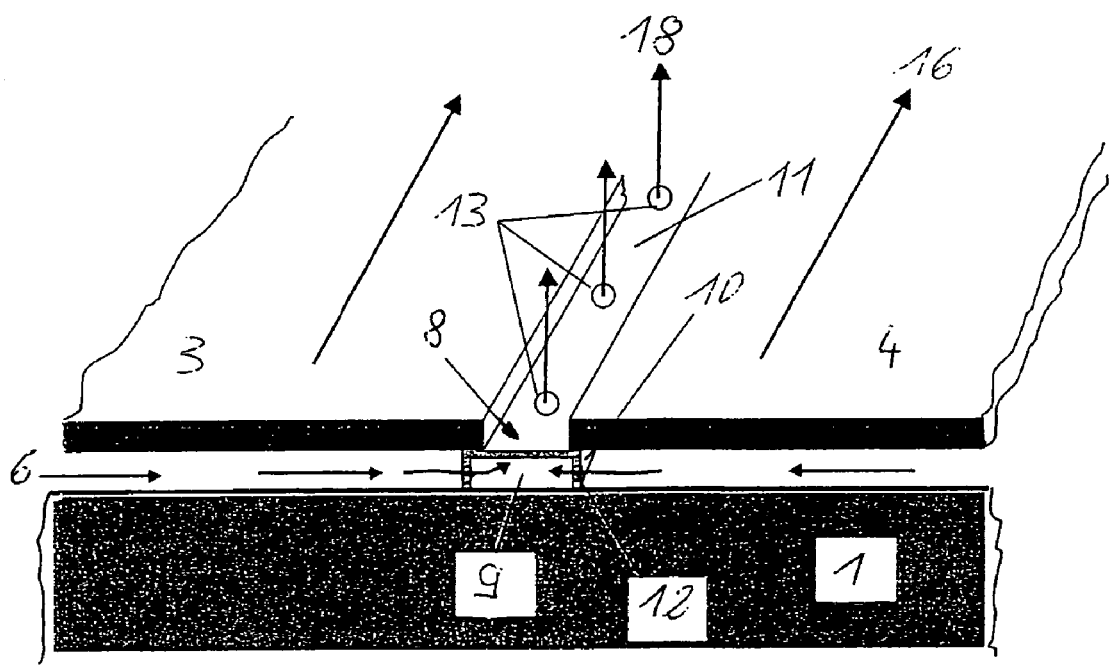
FIG. 2 shows a design principle of a sealing device between liner segments.

FIG. 2 illustrates a design principle of a sealing device (8) between liner segments (3;4). The sealing device (8) covers the gap (7) between the two liner segments (3;4). The sealing device (8) collects in the plenum (9) some of the cooling air (6) flowing between the casing (1) and the liner segments (3;4). For this purpose, the sealing device (8) is provided with inlet openings (12) along the sidewalls (10) which allow the cooling air (6) to enter the plenum (9). The shape, number and size of these openings (12) determines the pressure drop and the fraction of the total cooling air mass flow which is entering the plenum (9). In the simplest case, the openings (12) can be simple cylindrical holes but also can have any other appropriate shape. In the plenum (9) the cooling air (6) is distributed along the gap (7) between the liner segments (3;4) and discharged through the openings (13), distributed along the top side (11) of the sealing device (8). The total area of these cooling air exit openings (13) is usually somewhat smaller than the openings (12) for the cooling air inflow along the sidewalls (10), in order to always have a positive pressure drop and to avoid hot gas entering the plenum (9) underneath the seal (8). Again, the simplest shape of these openings (12) and (13) is that of a cylindrical hole, but other shapes are also possible. The jets (18) discharged through the openings (13) achieve the effect to dampen acoustic pulsations in the combustion chamber (17).

It is, of course, possible to embody the invention in other specific forms than that of the preferred embodiment, described above. This may be done without departing from the essence of the invention. The preferred embodiment is merely illustrative and should not be considered restrictive in any way.

To estimate the acoustic damping, one has to consider acoustic screen formed by the perforated top side (11) of the seal (8). The flow throughout the openings (13) distributed on the acoustic screen is responsible for the acoustic damping, being acoustic screen porosity and bias flow velocity able to realize the wanted condition on the resistance R. The plenum (9) upstream the acoustic screen forms the acoustic back cavity, designed to have zero reactance, i.e. X=0.

Figure 3:
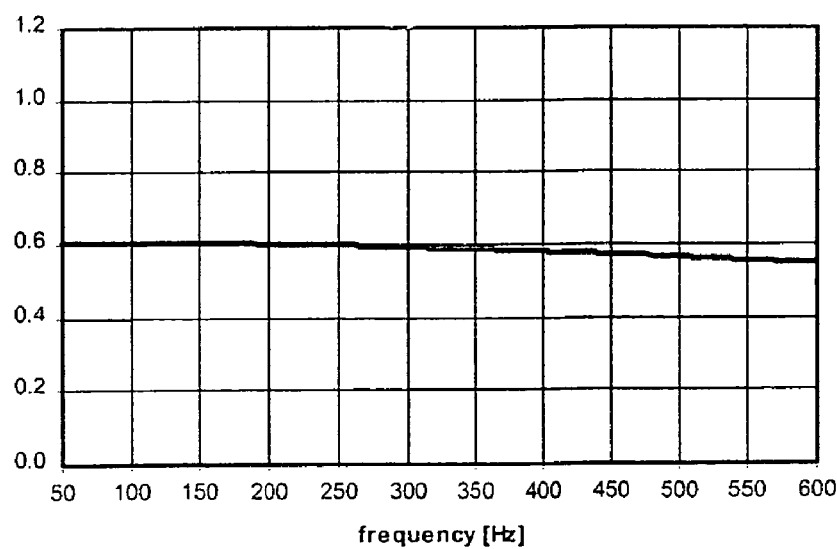
FIG. 3 shows an example of acoustic screen absorption by cooling air leakage.

FIG. 3 shows an example of numerical prediction of acoustic screen damping in terms of magnitude of the absorption coefficient $1-|r^2|$, being $r=(Z+\rho c)/(Z-\rho c)$ the reflection coefficient. The magnitude plot indicates the maximum absorption of the resonance frequency, which is also characterized by a typical phase jump.

Absorption curves addressing different frequencies may be obtained changing the design parameters. The maximum damping frequency depends on: hole diameter, hole thickness, speed of sound, distance between holes, back cavity thickness.

The value of the maximum damping depends mainly on the jet velocity. Thus, the design offers a variability of parameters which can be used to control the damping characteristics of the system. It is also possible, even to broaden the damping curve by using different parameters in different gaps (7) of different combustion chamber sectors.

However, it should be noted that the present invention is in no way restricted to a particular combustion chamber or sealing concept type.

LIST OF REFERENCES 1 outer casing
2 liner structure
3 liner segment
4 liner segment
5 cooling air duct
6 cooling airflow
7 gap
8 sealing device
9 plenum
10 side walls of (8)
11 top wall of (8)
12 inlet openings
13 outlet openings
14 cooling air leakage
15 burner
16 hot gas
17 combustion chamber
18 air jets

The invention claimed is:

1. A combustion chamber for a gas turbine, said combustion chamber comprising:
   a casing forming an outer structure of the combustion chamber;
   a liner structure spaced radially inwardly from the casing and forming an inner surface of the combustion chamber casing, said liner structure comprising a plurality of segments and a gap between adjacent segments;
   a cooling air duct between the casing and the liner segments;
   a sealing device in the gap between adjacent segments having a multiplicity of outlet openings to discharge jets of cooling air into the combustion chamber; and
   wherein the sealing device comprises a first side wall and a second side wall, both side walls arranged in the area of the cooling air duct, a third wall on a top side bridging the gap, a plenum formed by the side walls and the top wall, inlet openings along the side walls, and outlet openings along the top side in the area of the gap.

2. The combustion chamber according to claim 1, wherein the total area of the outlet openings is smaller than the total area of the inlet openings.

3. The combustion chamber according to claim 1, wherein both the outlet openings and the inlet openings comprise cylindrical holes.

4. A system comprising:
   a gas turbine including an annular combustion chamber; wherein the annular combustion chamber comprises a combustion chamber according to claim 1.

* * * * *